United States Patent
Nakamura et al.

(10) Patent No.: US 9,556,300 B2
(45) Date of Patent: Jan. 31, 2017

(54) METHOD FOR MANUFACTURING RESIN PARTICLES AND METHOD FOR MANUFACTURING TONER PARTICLES

(71) Applicant: CANON KABUSHIKI KAISHA, Tokyo (JP)

(72) Inventors: Kunihiko Nakamura, Gotemba (JP); Akane Masumoto, Yokohama (JP); Tsuneyoshi Tominaga, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/836,371

(22) Filed: Aug. 26, 2015

(65) Prior Publication Data

US 2015/0361205 A1 Dec. 17, 2015

Related U.S. Application Data

(63) Continuation of application No. PCT/JP2015/056066, filed on Mar. 2, 2015.

(30) Foreign Application Priority Data

Mar. 27, 2014 (JP) .................. 2014-067127

(51) Int. Cl.
| | |
|---|---|
| *G03G 9/087* | (2006.01) |
| *C08F 222/10* | (2006.01) |
| *C08F 12/08* | (2006.01) |
| *C08F 12/24* | (2006.01) |
| *G03G 9/08* | (2006.01) |
| *C08F 12/22* | (2006.01) |
| *C08F 12/32* | (2006.01) |
| *G03G 9/09* | (2006.01) |

(52) U.S. Cl.
CPC ............. *C08F 222/10* (2013.01); *C08F 12/08* (2013.01); *C08F 12/22* (2013.01); *C08F 12/24* (2013.01); *C08F 12/32* (2013.01); *G03G 9/08* (2013.01); *G03G 9/087* (2013.01); *G03G 9/09* (2013.01)

(58) Field of Classification Search
CPC ........... C08F 12/22; C08F 12/08; C08F 12/32; C08F 12/24; C08F 222/10; G03G 9/09; G03G 9/08; G03G 9/087
See application file for complete search history.

(56) References Cited

U.S. PATENT DOCUMENTS

| | | | | |
|---|---|---|---|---|
| 8,609,312 | B2 * | 12/2013 | Itabashi | G03G 9/08795 430/108.3 |
| 2013/0164673 | A1 * | 6/2013 | Yoshida | G03G 9/08755 430/137.1 |

FOREIGN PATENT DOCUMENTS

| | | |
|---|---|---|
| JP | 2-256071 A | 10/1990 |
| JP | 4-212971 A | 8/1992 |
| JP | 2004-176036 A | 6/2004 |
| JP | 2005-281660 A | 10/2005 |
| JP | 2011-137967 A | 7/2011 |
| JP | 2012-256043 A | 12/2012 |
| JP | 2012-256044 A | 12/2012 |
| JP | 2013-152444 A | 8/2013 |
| JP | 2014-002310 A | 1/2014 |

* cited by examiner

*Primary Examiner* — Peter Vajda
(74) *Attorney, Agent, or Firm* — Canon U.S.A., Inc. IP Division

(57) ABSTRACT

A method for manufacturing resin particles, including the step of producing the resin particles by using a liquid which is prepared with a resin having an ionic functional group and a pKa of 6.0 to 9.0, an organic solvent, which can dissolve the resin and which has a solubility parameter of 12.0 or less, water, and a neutralizer, wherein the neutralizer contains an acid having a pKa of 3.0 or less or a base having a pKb of 3.0 or less.

12 Claims, No Drawings

METHOD FOR MANUFACTURING RESIN PARTICLES AND METHOD FOR MANUFACTURING TONER PARTICLES

CROSS-REFERENCE TO RELATED APPLICATIONS

This application is a Continuation of International Patent Application No. PCT/JP2015/056066, filed Mar. 2, 2015, which claims the benefit of Japanese Patent Application No. 2014-067127, filed Mar. 27, 2014, both of which are hereby incorporated by reference herein in their entirety.

TECHNICAL FIELD

The present invention relates to a method for manufacturing resin particles mainly used for manufacturing toner particles for electrophotography and a method for manufacturing toner particles.

BACKGROUND ART

In recent years, imaging apparatuses (electrophotographic apparatuses), e.g., copying machines and printers, have been required to enhance the speed of image output and ensure high stability of output images in various use environments. For example, printers and the like, which have been previously used in offices in most cases, have been employed in severe high-temperature, high-humidity environments in recent years. Meanwhile, printers by using a one-component development system, which are suitable for miniaturization and enhancement of the speed, have increased because of demands for miniaturization and enhancement of the speed. In the one-component development system, there are few opportunities of contact between the toner and a member to charge the toner as compared with that in a two-component development system by using a carrier. Therefore, the amount of charge required for the toner has to be given by application of a relatively high stress. Consequently, it is necessary that the durability and the chargeability of the toner be improved in not only a common environment but also high-temperature, high-humidity environments.

PTL 1 describes a charge controlling agent having reduced hygroscopicity in a high-humidity environment.

However, it is difficult to make the charge controlling agent selectively present on the surfaces of the toner particles, so that the effect is not exerted easily and the density of an output image in a high-humidity environment may be reduced.

PTL 2 describes a toner obtained by aggregating and fusing resin particles, which are obtained by using a phase inversion emulsification method, on surfaces of core particles. In this case, resin particles are made to be selectively present on the outermost surfaces of toner particles easily.

However, the resin particles described in PTL 2 do not ensure sufficient charge stability in a high-humidity environment and the density of an output image in a high-humidity environment may be reduced.

Also, PTL 3 describes a toner, to which resin particles including a unit having a salicylic acid based substituent are allowed to adhere.

However, the resin particles described in PTL 3 have a broad particle size distribution and the durability may be poor.

CITATION LIST

Patent Literature

PTL 1: Japanese Patent Laid-Open No. 2012-256044
PTL 2: Japanese Patent Laid-Open No. 2014-002310
PTL 3: Japanese Patent Laid-Open No. 2011-137967

SUMMARY OF INVENTION

It is an object of the present invention to provide a method for manufacturing resin particles exhibiting excellent environmental stability (in particular, charge stability in a high-humidity environment) and having sharp particle size distribution.

The above-described object can be achieved by the present invention. The present invention is a method for manufacturing resin particles, each of which contains a resin having an ionic functional group and a pKa of 6.0 or more and 9.0 or less, the method including the step of producing the resin particles by using a liquid which is prepared with the resin, an organic solvent, which can dissolve the resin and which has a solubility parameter of 12.0 or less, water, and a neutralizer in an amount necessary for neutralizing 50 percent by mole or more and 90 percent by mole or less of the ionic functional group, wherein the neutralizer contains at least one type selected from the group consisting of an acid having a pKa of 3.0 or less and a base having a pKb of 3.0 or less.

Further features of the present invention will become apparent from the following description of exemplary embodiments.

DESCRIPTION OF EMBODIMENTS

The present inventors conducted intensive research. As a result, it was found that resin particles exhibiting excellent environmental stability and having sharp particle size distribution was obtained by the manufacturing method described below.

That is, the method for manufacturing resin particles is characterized by including the step of producing the resin particles by using a liquid which is prepared with a resin having an ionic functional group and a pKa (referring to acid dissociation constant) of 6.0 or more and 9.0 or less, an organic solvent, which can dissolve the resin and which has a solubility parameter of 12.0 or less, water, and a neutralizer in an amount necessary for neutralizing 50 percent by mole or more and 90 percent by mole or less of the ionic functional group to produce the resin particles, each of which contains the resin, wherein the neutralizer contains at least one type selected from the group consisting of an acid having a pKa of 3.0 or less and a base having a pKb (referring to base dissociation constant) of 3.0 or less.

To begin with, it is necessary that the resin having an ionic functional group and a pKa of 6.0 or more and 9.0 or less be used for the purpose of improving the environmental stability.

In general, a resin having a functional group, e.g., sulfonic acid or carboxylic acid, serving as the resin having an ionic functional group is used for the toner. Such a resin adsorbs moisture easily and under the influence thereof, the amount of charge of the toner may be reduced in a high-humidity environment.

Then, the present inventors noted the pKa of the ionic functional group.

Specifically, the pKa of the resin having an ionic functional group is specified to be 6.0 or more and 9.0 or less and, thereby, the hygroscopicity of the functional group is reduced and reduction in the amount of charge of the toner in a high-humidity environment is suppressed. The pKa is preferably 7.0 or more and 8.5 or less, and more preferably 7.0 or more and 8.0 or less.

The pKa can be determined from the result of neutralization titration, although a detailed method for determination will be described later.

Examples of resins having an ionic functional group include resins having a hydroxy group bonding to an aromatic ring or a carboxy group bonding to an aromatic ring. These resins have a pKa in the above-described range easily. Among such resins, resins obtained by polymerizing vinylsalicylic acid, phthalic acid 1-vinyl, vinyl benzoic acid, and 1-vinylnaphthalene-2-carboxylic acid are preferable.

Also, Polymer A having a monovalent group represented by Formula (1) described below is more preferable as the resin having an ionic functional group.

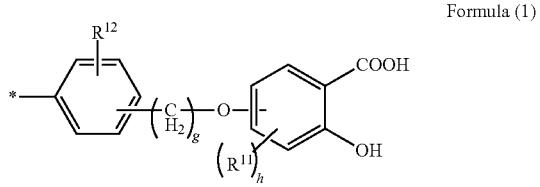

Formula (1)

(In Formula (1), $R^{11}$ represents a hydroxy group, a carboxy group, an alkyl group having the carbon number of 1 or more and 18 or less, or an alkoxy group having the carbon number of 1 or more and 18 or less, $R^{12}$ represents a hydrogen atom, a hydroxy group, an alkyl group having the carbon number of 1 or more and 18 or less, or an alkoxy group having the carbon number of 1 or more and 18 or less, g represents an integer of 1 or more and 3 or less, h represents an integer of 0 or more and 3 or less, in the case where h is 2 or 3, $R^{11}$s, the number of which is h, may be the same or be different from each other, and an asterisk represents a bonding site of a functional group in the polymer.)

Examples of alkyl groups in $R^{11}$ and $R^{12}$ include a methyl group, an ethyl group, a propyl group, an isopropyl group, a butyl group, an isobutyl group, a s-butyl group, and a tert-butyl group. Also, examples of alkoxy groups include a methoxy group, an ethoxy group, and a propoxy group.

As for the structure of the main chain of Polymer A, various polymers are mentioned. Examples include vinyl polymers, polyesters, polyamides, polyurethanes, and polyethers. Also, hybrid type polymers in which at least two types of them are combined are mentioned. Among them, vinyl polymers are preferable in consideration of adhesion between the resulting resin particles and base particles carrying the resin particles on the surfaces.

Examples of vinyl monomers usable for synthesis of the vinyl polymers include styrene and derivatives thereof, e.g., styrene, o-methyl styrene, m-methyl styrene, p-methyl styrene, and α-methyl styrene; ethylene unsaturated monoolefins, e.g., ethylene, propylene, butylene, and isobutylene; vinyl halides, e.g., vinyl chloride, vinylidene chloride, vinyl bromide, and vinyl fluoride; vinyl ester acids, e.g., vinyl acetate, vinyl propionate, vinyl benzoate; acrylic acid esters, e.g., acrylic acid-n-butyl and acrylic acid-2-ethylhexyl; methacrylic acid esters in which acryl of the above-described acrylic acid esters is changed to methacryl; methacrylic acid amino esters, e.g., methacrylic acid dimethylaminoethyl and methacrylic acid diethylaminoethyl; vinyl ethers, e.g., vinyl methyl ether and vinyl ethyl ether; vinyl ketones, e.g., vinyl methyl ketone; N-vinyl compounds, e.g., N-vinyl pyrrole; vinyl naphthalenes; acrylonitrile, methacrylonitrile, acrylic acid or methacrylic acid derivatives e.g., acrylamide, acrylic acid, and methacrylic acid. In this regard, as for the vinyl monomers, at least two types may be used in combination, as necessary.

Meanwhile, in the case where Polymer A is a vinyl polymer, the content of the monovalent group contained in Polymer A and represented by Formula (1) described above is preferably 0.1 percent by mole or more and 10.0 percent by mole or less, where the total units (units derived from monomers) constituting Polymer A are specified to be 100 percent by mole. The chargeability and the durability of the toner becomes better by employing 0.1 percent by mole or more. Also, charge up of the toner is further suppressed by employing 10.0 percent by mole or less.

Next, the organic solvent which can dissolve the above-described resin having an ionic functional group and a pKa of 6.0 or more and 9.0 or less will be described.

The organic solvent used in the present invention is an organic solvent having a solubility parameter of 12.0 or less.

The solubility parameter is a value defined on the basis of the regular solution theory introduced by Hildebrand and serves as an index of the solubility of a binary solution.

In order to produce resin particles, it is necessary that the organic solvent dissolve the above-described resin having an ionic functional group and, in addition, be phase-separated from water. The solubility parameter of water is 24.3. Therefore, phase separation between water and the organic solvent occurs by using the organic solvent having a solubility parameter of 12.0 or less apart from the solubility parameter of the water, and resin particles having sharp particle size distribution can be produced.

Examples of such organic solvents include normal pentane (7.0), normal hexane (7.3), diethyl ether (7.4), normal octane (7.6), cyclohexane (8.2), isobutyl acetate (8.3), isopropyl acetate (8.4), butyl acetate (8.5), carbon tetrachloride (8.6), methyl propyl ketone (8.7), xylene (8.8), toluene (8.8), ethyl acetate (9.0), tetrahydrofuran (9.1), benzene (9.2), trichloroethyl (9.2), methyl ethyl ketone (9.3), chloroform (9.3), dibutyl phthalate (9.4), acetone (9.9), acetonitrile (11.9), and dimethylformamide (12.0). The numerical value inside the parentheses is a solubility parameter of each organic solvent. These organic solvents may be used alone or at least two types may be used in combination.

Next, the neutralizer to neutralize the ionic functional group included in the above-described organic solvent will be described.

The neutralizer used in the present invention contains at least one type selected from the group consisting of an acid having a pKa of 3.0 or less in water and a base having a pKb of 3.0 or less in water. In this regard, the values of pKa and pKb of strong acids and strong bases are not always specified. However, it is clear that the pKa or pKb is 3.0 or less and, therefore, they are included in an acid having a pKa of 3.0 or less and a base having a pKb of 3.0 or less in water.

Examples of an acid having a pKa of 3.0 or less in water include hydrochloric acid, bromic acid, iodic acid, perbromic acid, metaperiodic acid, permanganic acid, thiocyanic acid, sulfuric acid, nitric acid, phosphoric acid, phosphoric acid, diphosphoric acid, hexafluorophosphoric acid, tetrafluoroboric acid, tripolyphosphoric acid, aspartic acid, o-aminobenzoic acid, p-aminobenzoic acid, isonicotinic acid, oxaloacetic acid, citric acid, 2-glycerol phosphate, glutamic acid, cyanoacetic acid, oxalic acid, trichloroacetic acid, o-nitrobenzoic acid, nitroacetic acid, picric acid, picolinic acid, pyruvic acid, fumaric acid, fluoroacetic acid, bromoacetic acid, o-bromobenzoic acid, maleic acid, and malonic acid. These acid may be used alone or at least two types may be used in combination.

Among the above-described acids, monovalent acids are preferable from the viewpoint of ease of cleaning after production of resin particles. Among the monovalent acids, hydrochloric acid and nitric acid are preferable.

Examples of a base having a pKb of 3.0 or less in water include lithium hydroxide, sodium hydroxide, potassium hydroxide, rubidium hydroxide, cesium hydroxide, tetramethylammonium hydroxide, tetraethylammonium hydroxide, calcium hydroxide, strontium hydroxide, barium hydroxide, magnesium hydroxide, europium hydroxide, thallium hydroxide, and guanidine.

Among the above-described bases, monovalent bases are preferable because the above-described ionic functional group is dissociated easily. Among the monovalent bases, bases having Li, bases having Na, and bases having K are preferable. Among them, lithium hydroxide (LiOH), sodium hydroxide (NaOH), and potassium hydroxide (KOH) are preferable.

Meanwhile, salts irrelevant to neutralization may be added separately or the acid and the base may be used in combination insofar as the effects of the present invention are not impaired. For example, a small amount of hydrochloric acid and a large amount of sodium hydroxide may be added to generate sodium chloride irrelevant to neutralization.

Examples of methods for producing resin particles include an emulsion polymerization method, a soap-free emulsion polymerization method, a phase inversion emulsification method, and a mechanical emulsification method. Among them, the phase inversion emulsification method is preferable because an emulsifier and a dispersion stabilizer are unnecessary and resin particles having small particle diameters are obtained easily.

As described above, resins having an ionic functional group, which exhibits self emulsifiability through neutralization, is used for production of resin particles in the present invention. Specifically, the self emulsifiability is exhibited by using a resin having the ionic functional group and a pKa of 6.0 or more and 9.0 or less and, in addition, neutralizing 50 percent by mole or more and 90 percent by mole or less of the ionic functional group.

The mechanism thereof is not clear, although the present inventors consider as described below.

In the manufacturing method according to the present invention, resin particles are produced through self emulsification of the resin having an ionic functional group. In order to induce self emulsification, it is necessary to control the balance between hydrophilic groups and hydrophobic groups of the resin.

Usually, the composition of the resin is changed in order to change the balance between hydrophilic groups and hydrophobic groups of the resin. In this case, the composition of the produced resin particles is changed. Therefore, in the case where the resin particles are used for a toner, the performance of the toner is also changed.

The present inventors conducted intensive research and, as a result, found that the balance between hydrophilic groups and hydrophobic groups of the resin was able to be controlled by a method in which the degree of dissociation of the ionic functional group was changed instead of changing the composition of the resin. Specifically, in the method, a resin having an ionic functional group and a pKa of 6.0 or more and 9.0 or less is used and, in addition, 50 percent by mole or more and 90 percent by mole or less of the ionic functional group concerned is neutralized.

In the case where the pKa of the resin is less than 6.0 or the pKa of the resin is more than 9.0, the ionic functional group are almost dissociated, so that even when the degree of neutralization is changed, the balance between hydrophilic groups and hydrophobic groups of the resin in itself is not changed easily.

On the other hand, the resin having an ionic functional group and a pKa of 6.0 or more and 9.0 or less is close to neutral and, therefore, exhibits high environmental stability. Then, as for such a resin, the ionic functional group can be dissociated by neutralizing the ionic functional group with a neutralizer.

Consequently, in the case of the above-described resin, the balance between hydrophilic groups and hydrophobic groups of the resin can be ensured by controlling the degree of neutralization (to be 50 percent by mole or more and 90 percent by mole or less), so that the self emulsifiability of the resin can be exhibited. In this regard, the degree of neutralization can be controlled by adjusting the usage of the neutralizer.

In the case where the degree of neutralization is smaller than 50 percent by mole, the degree of dissociation of the ionic functional group is low, the hydrophilicity of the resin is reduced (the hydrophobicity is enhanced), so that the self emulsifiability is reduced and the particle diameters of the resulting resin particles increase.

In the case where the degree of neutralization is more than 90 percent by mole, the hydrophilicity of the resin is enhanced, so that the resin becomes unstable in the organic solvent serving as the solvent of the resin. As a result, the particle size distribution of the resulting resin particles becomes broad.

Also, as described above, in the case where resin particles are produced by utilizing self emulsifiability, it is unnecessary to use an emulsifier or dispersing agent separately. Therefore, the step to remove the emulsifier or dispersing agent after the resin particles are produced can be omitted. However, the emulsifier or dispersing agent may be used insofar as the effects of the present invention are not impaired.

The resin particles produced by the above-described method can impart good chargeability to the toner by being allowed to adhere to the surfaces of toner base particles. In particular, high chargeability is exhibited in a high-temperature, high-humidity environment, so that changes in densities of output images due to the environment are small. In addition, the particle size distribution of resin particles is sharp, so that detachment of resin particles from the toner base particles can be suppressed and the durability of the toner becomes good.

In order to produce resin particles, it is preferable that the steps described in the following items (1) to (4) be performed in that order.

(1) Step to obtain a resin-containing solution, in which a resin is dissolved in an organic solvent by mixing the resin having an ionic functional group and a pKa of 6.0 or more and 9.0 or less and the organic solvent, which can dissolve the resin and which has a solubility parameter of 12.0 or less (2) Neutralizer mixing step to obtain a mixed solution, in which 50 percent by mole or more and 90 percent by mole or less of the ionic functional group in the resin is neutralized with the above-described neutralizer by mixing the resin-containing solution and the neutralizer (3) Granulation step to obtain a dispersion, in which particles of the mixed solution are dispersed in water (4) Step to remove the organic solvent from the dispersion In the granulation step, granulation may be performed through phase inversion emulsification or granulation may be performed through agitation.

The median diameter (Dv50) on a volume basis of the resin particles is preferably 5 nm or more and 200 nm or less, and more preferably 20 nm or more and 130 nm or less. If the median diameter is 5 nm or more, the durability of the toner is more improved. Also, if the median diameter is 200 nm or less, adhesion of the resin particles to the toner base particles becomes more uniform.

The ratio Dv50/Dn50 of the median diameter (Dv50) on a volume basis to the median diameter (Dn50) on a number basis of the resin particles is preferably 2.5 or less, and more preferably 2.2 or less.

A smaller Dv50/Dn50 indicates that the particle size distribution of resin particles is more uniform (sharper). As the resin particles have sharper particle size distribution, the durability of the toner is improved because the resin particles are allowed to adhere to toner base particles uniformly.

The amount of adhesion of resin particles is preferably 0.1 parts by mass or more and less than 5.0 parts by mass relative to 100 parts by mass of toner base particles. In the case where 0.1 parts by mass or more is employed, uniformity of adhesion is obtained between toner particles. As a result, the chargeability of the toner becomes better and the durability of the toner becomes better. Also, in the case where less than 5.0 parts by mass is employed, harmful effects on the output image resulting from excess resin particles can be suppressed while good durability of the toner is ensured.

In order to facilitate sufficient adhesion, the resin particles may be embedded into the base particles by a mechanical impact force after being allowed to adhere to the base particle surfaces. Also, adhesion may be facilitated through smoothing by heating to a temperature higher than or equal to the glass transition temperature (Tg) of the resin particles and toner base particles.

Examples of binder resins used for the toner base particles of the toner particles according to the present invention include styrene resins, acrylic resins, methacrylic resins, styrene-acrylic resins, styrene-methacrylic resins, styrene-acryl-methacrylic resins, polyethylenes, ethylene-vinyl acetate copolymers, polyvinyl acetates, polybutadienes, phenol resins, polyurethanes, polybutyrals, and polyesters. In addition, hybrid resins in which these resins are bonded are mentioned. Among them, styrene resins, acrylic resins, methacrylic resins, styrene-acrylic resins, styrene-methacrylic resins, polyesters, hybrid resins in which styrene-acrylic resins or styrene-methacrylic resins and polyesters are bonded are preferable.

As for the above-described polyesters, polyesters produced by employing alcohol components, e.g., polyhydric alcohols, and acid components, e.g., carboxylic acids, carboxylic acid anhydrides, or carboxylic acid esters, as raw material monomers are preferable. Among them, polyesters in which diols, e.g., bisphenol derivatives, and carboxylic acids of at least divalent or acid anhydrides thereof are subjected to condensation polymerization are preferable.

Examples of carboxylic acids of at least divalent include fumaric acid, maleic acid, maleic acid anhydride, phthalic acid, terephthalic acid, trimellitic acid, and pyromellitic acid.

The toner by using the resin particles according to the present invention may be a magnetic toner. Examples of magnetic materials used for the magnetic toner include iron oxides, e.g., magnetite, maghemite, and ferrite, iron oxides containing other metal oxides, metals, e.g., Fe, Co, and Ni, alloys of these metals and metals, e.g., Al, Co, Cu, Pb, Mg, Ni, Sn, Zn, Sb, Ca, Mn, Se, and Ti, and mixtures thereof. More specific examples include ferrosoferric oxide ($Fe_3O_4$), iron sesquioxide ($\gamma$-$Fe_2O_3$), zinc iron oxide ($ZnFe_2O_4$), copper iron oxide ($CuFe_2O_4$), neodymium iron oxide ($NdFe_2O_3$), barium iron oxide ($BaFe_{12}O_{19}$), magnesium iron oxide ($MgFe_2O_4$), and manganese iron oxide ($MnFe_2O_4$). Among them, ferrosoferric oxide ($Fe_3O_4$) and iron sesquioxide ($\gamma$-$Fe_2O_3$) are preferable. These magnetic materials may be used alone or at least two types may be used in combination.

These magnetic materials have average particle diameters of preferably 0.1 µm or more and 2 µm or less, and more preferably 0.1 µm or more and 0.3 µm or less. Meanwhile, as for the magnetic characteristics at application of 795.8 kA/m (10 k oersted), the coercive force (Hc) is preferably 1.6 kA/m or more and 12 kA/m or less (20 oersted or more and 150 oersted or less). Also, the saturation magnetization ($\sigma$s) is preferably 5 $Am^2/kg$ or more and 200 $Am^2/kg$ or less, and more preferably 50 $Am^2/kg$ or more and 100 $Am^2/kg$ or less. The residual magnetization ($\sigma$r) is preferably 2 $Am^2/kg$ or more and 20 $Am^2/kg$ or less.

In the case where the magnetic material is used, the amount of magnetic material contained in toner particles (toner base particles) is preferably 10 parts by mass or more and 200 parts by mass or less, and more preferably 20 parts by mass or more and 150 parts by mass or less relative to 100 parts by mass of binder resin contained in the toner particles (toner base particles).

The toner by using the resin particles according to the present invention may be a nonmagnetic toner.

As for colorants used for the toner particles (toner base particles), various dyes, pigments, and the like can be used.

Examples of color pigments for magenta include C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:1, 48:2, 48:3, 48:4, 48:5, 49, 50, 51, 52, 53, 54, 55, 57:1, 58, 60, 63, 64, 68, 81:1, 81:2, 81:3, 81:4, 81:5, 83, 87, 88, 89, 90, 112, 114, 122, 123, 146, 147, 150, 163, 184, 185, 202, 206, 207, 209, 238, 269, and 282; C.I. Pigment Violet 19; and C.I. Vat Red 1, 2, 10, 13, 15, 23, 29, and 35.

Examples of color pigments for cyan include copper phthalocyanine compounds and derivatives thereof, anthraquinone compounds, and basic dye lake compounds. Specific examples include C.I. Pigment Blue 1, 7, 15, 15:1, 15:2, 15:3, 15:4, 60, 62, and 66.

Examples of color pigments for yellow include condensed azo compounds, isoindolinone compounds, anthraquinone compounds, azo metal complexes, methine compounds, and allylamide compounds. Specific examples include C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, and 185; and C.I. Vat Yellow 1, 3, and 20.

Examples of colorants for black include carbon black, aniline black, acetylene black, and titanium black. In addition, a colorant produced by using the above-described yellow colorant/magenta colorant/cyan colorant and performing tone adjustment to black can be used.

The above-described colorants may be used alone or at least two types may be used in combination.

The toner particles (toner base particles) by using the resin particles according to the present invention may contain a release agent.

Examples of release agents include aliphatic hydrocarbon wax, e.g., low-molecular weight polyethylene, low-molecular weight polypropylene, microcrystalline wax, and paraffin wax; oxides of aliphatic hydrocarbon wax, e.g., oxidized polyethylene wax; block copolymers of aliphatic hydrocarbon wax; wax primarily containing a fatty acid ester, e.g., carnauba wax, Sasol Wax, and montanoic acid ester wax; partially or entirely deoxidized fatty acid esters, e.g., deoxidized carnauba wax; partially esterified products of fatty acid and polyhydric alcohol, e.g., behenic acid monoglyceride; and methyl ester compounds having a hydroxy group obtained by hydrogenating vegetable oils and fats.

As for the molecular weight distribution of the release agent, a main peak is present preferably within the molecular weight region of 400 or more and 2,400 or less, and more preferably within the region of 430 or more and 2,000 or less. Consequently, preferable fusion characteristics can be imparted to the toner.

The amount of addition of the release agent is preferably 2.50 parts by mass or more and 40.0 parts by mass or less, and more preferably 3.00 parts by mass or more and 15.0 parts by mass or less relative to 100 parts by mass of binder resin contained in the toner particles (toner base particles).

The toner particles according to the present invention are obtained by allowing the resin particles to adhere to the surfaces of the toner base particles containing the binder resin and, as necessary, a colorant and a release agent. The method for manufacturing the toner particles (toner base particles) is preferably a suspension polymerization method.

The methods for measuring various properties in the present invention will be described below.

Measurement of Dv50 on a Volume Basis and Dn50 on a Number Basis of Resin Particles The median diameter (Dv50) on a volume basis and the median diameter (Dn50) on a number basis of the resin particles were calculated by using Zetasizer Nano-ZS (trade name) produced by MALVERN, utilizing Dynamic Light Scattering (DLS), and measuring the particle size.

Initially, the power to the apparatus (Zetasizer) was turned on, and there was a wait of 30 minutes until the laser was stabilized. Thereafter, Zetasizer software was started.

Manual was selected from Measure menu, and details of measurement were input as described below.
Measurement mode: Particle diameter
Material: Polystyrene latex (RI: 1.59, Absorption: 0.01)
Dispersant: Water (Temperature: 25° C., Viscosity: 0.8872 cP,
RI: 1.330)
Temperature: 25.0° C.
Cell: Clear disposable zetacell
Measurement duration: Automatic A sample was prepared by being diluted with water in such a way as to become 0.50 percent by mass and was filled into a disposable capillary cell (DTS1060). The cell was loaded into a cell holder of the apparatus.

After the above-described preparation was finished, the Start button on the measurement display screen was pushed to perform the measurement.

The Dv50 on a volume basis and the Dn50 on a number basis of the resin particles were calculated on the basis of the data of particle size distribution on a volume basis and on a number basis converted from the light intensity distribution, which was obtained by the DLS measurement, following the Mie theory.

Particle Diameter of Toner Particles

The weight average particle diameter (D4) and the number average particle diameter (D1) of the toner were calculated as described below.

As for the measuring apparatus, an accurate particle size distribution analyzer (trade name: Coulter Counter Multisizer 3) produced by Beckman Coulter, Inc., was used, where an electrical sensing zone method was utilized and a 100 μm aperture tube was provided. Setting of the measurement condition and analysis of the measurement data were performed by using attached dedicated software (trade name: Beckman Coulter Multisizer 3 Version 3.51) produced by Beckman Coulter, Inc. In this regard, the measurement was performed at the number of effective measurement channels of 25,000.

As for an electrolytic aqueous solution used for the measurement, a solution in which analytical grade sodium chloride was dissolved into ion-exchanged water in such a way as to have a concentration of about 1 percent by mass, specifically an electrolytic aqueous solution (trade name: ISOTON II) produced by Beckman Coulter, Inc., was used.

In this regard, before the measurement and the analysis were performed, the above-described dedicated software was set as described below.

In a screen for "Changing a standard operation method of measurement (SOMME)" of the above-described dedicated software, the total count number in the control mode was set at 50,000 particles, the number of measurements was set at 1, and a Kd value was set at a value obtained by using "Standard particles 10.0 μm" (produced by Beckman Coulter, Inc.). A threshold value and a noise level were automatically set by pressing a "Threshold value/noise level measurement button". In addition, Current was set at 1,600 μA, Gain was set at 2, Electrolytic solution was set at ISOTON II, and "Flush of aperture tube after measurement" was checked.

In a screen for "Setting conversion from pulse to particle diameter" of the above-described dedicated software, Bin interval was set at logarithmic particle diameter, Particle diameter bin was set at 256 particle diameter bin, and Particle diameter range was set at 2 μm to 60 μm.

Specific measuring method is as described below.

(1) A 250 mL round-bottom glass beaker dedicated to Multisizer 3 was charged with 200 mL of the above-described electrolytic aqueous solution, the beaker was set into a sample stand, and counterclockwise agitation with a stirrer rod was performed at 24 revolutions/sec. Then, contamination and air bubbles in the aperture tube were removed by an "Aperture flush" function of the above-described dedicated software.

(2) A 100 mL flat-bottom glass beaker was charged with 30 mL of the above-described electrolytic aqueous solution. Addition of 0.3 mL of diluted liquid prepared by diluting a dispersing agent (trade name: Contaminon N that was 10-percent by mass aqueous solution of neutral detergent for precision measurement appliance cleaning which included a nonionic surfactant, an anionic surfactant, and an organic builder and which had a pH of 7) produced by Wako Pure Chemical Industries, Ltd., with ion-exchanged water by a factor of 3 on a mass basis was performed thereto as a dispersing agent.

(3) An ultrasonic dispersion device (trade name: Ultrasonic Dispersion System Tetra 150) produced by Nikkaki Bios Co., Ltd., was prepared. This ultrasonic dispersion device included two oscillators, which had an oscillation frequency of 50 kHz, with their phases shifted by 180° from each other. The electrical output of the ultrasonic dispersion device was specified to be 120 W, 3.3 L of ion-exchanged water was put into a water tank of the ultrasonic dispersion device, and 2 mL of Contaminon N described above was added to this water tank.

(4) The beaker according to the above-described item (2) was set into a beaker fixing hole of the above-described ultrasonic dispersion device, and the ultrasonic dispersion device was operated. Then, the height position of the beaker was adjusted in such a way that the resonance state of the liquid surface of the electrolytic aqueous solution in the beaker became at a maximum level.

(5) In the state in which the electrolytic aqueous solution in the beaker according to the above-described item (4) was irradiated with ultrasonic waves, 10 mg of toner was added gradually to the above-described electrolytic aqueous solution and was dispersed. Subsequently, the ultrasonic dispersion treatment was continued for further 60 seconds. In this regard, in the ultrasonic dispersion, the water temperature of the water tank was appropriately adjusted to become 10° C. or higher and 40° C. or lower.

(6) The electrolytic aqueous solution containing dispersed toner, according to the above-described item (5), was dropped to the round-bottom beaker set into the sample stand, according to the above-described item (1), by using a pipette in such a way that the measured concentration was adjusted to 5%. Then, the measurement was performed until the number of measured particles reached 50,000.

(7) The weight average particle diameter (D4) and the number average particle diameter (D1) were calculated by analyzing the measurement data with the above-described dedicated software attached to the apparatus. In this regard, an "Average diameter" on an "Analysis/volume statistical value (arithmetic mean)" screen, where graph/volume % is set in the above-described dedicated software, corresponds to the weight average particle diameter (D4). Also, an "Average diameter" on an "analysis/number statistical value (arithmetic mean)" screen, where graph/number % is set in the above-described dedicated software, corresponds to the number average particle diameter (D1).

Measurement of Acid Value

The acid value refers to the amount of potassium hydroxide in mg required for neutralizing acid contained in 1 g of sample. The acid value in the present invention was measured in conformity with JIS K 0070-1992. Specifically, the measurement was performed following the procedure described below.

Titration was performed by using 0.1 mol/L potassium hydroxide ethyl alcohol solution (produced by KISHIDA CHEMICAL Co., Ltd.). The factor of the above-described potassium hydroxide ethyl alcohol solution was determined by using a potentiometric titrator (trade name: AT-510) produced by Kyoto Electronics Manufacturing Co., Ltd. The acid value was determined on the basis of the amount of the above-described potassium hydroxide ethyl alcohol solution required for neutralization, where 100 mL of 0.100 mol/L hydrochloric acid was taken into a 250 mL tall beaker and titration was performed with the above-described potassium hydroxide ethyl alcohol solution. The above-described 0.100 mol/L hydrochloric acid was prepared in conformity with JIS K 8001-1998 and was used.

The measurement condition in the acid value measurement were as described below.

Titrator: potentiometric titrator AT-510 (produced by Kyoto Electronics Manufacturing Co., Ltd.)
Electrode: combination glass electrode double junction type (produced by Kyoto Electronics Manufacturing Co., Ltd.)
Software for Titrator: AT-WIN
Analysis Software for Titration Results: Tview The titration parameter and control parameter in titration were as described below.

Titration parameter
Titration mode: blank titration
Titration form: full titration
Maximum amount of titration: 20 mL
Wait time before titration: 30 seconds
Titration direction: automatic
Control parameter
Endpoint sense potential: 30 dE
Endpoint sense differential: 50 dE/dmL
Endpoint potential setup: off
Control speed mode: standard
Gain: 1
Data sampling potential: 4 mV
Data sampling volume: 0.1 mL Actual Test Precise weighing of 0.100 g of measurement sample was performed, the sample was put into a 250 mL tall beaker, 150 mL of mixed solution of toluene/ethanol (3:1) was added, and dissolution was performed over 1 hour. The above-described potentiometric titrator was used, and titration with the above-described potassium hydroxide ethyl alcohol solution was performed.

Blank Test

Titration was performed in the same manner as the above-described operation except that the sample was not used (that is, only the mixed solution of toluene/ethanol (3:1) was used).

The acid value was calculated by substituting the obtained results into the following formula.

$$A=[(C-B)\times f\times 5.611]/S$$

(in the above-described formula, A represents the acid value (mgKOH/g) of the sample, B represents the amount of addition (mL) of the potassium hydroxide ethyl alcohol solution in the blank test, C represents the amount of addition (mL) of the potassium hydroxide ethyl alcohol solution in the actual test, f represents the factor of the potassium hydroxide solution, and S represents the mass (g) of the sample)

Measurement of pKa of Resin Having Ionic Functional Group

Precise weighing of 0.100 g of measurement sample was performed, the sample was put into a 250 mL tall beaker, 150 mL of tetrahydrofuran was added, and dissolution was performed over 30 minutes. A pH electrode was put into the resulting solution, and the pH of the tetrahydrofuran solution of the sample was read. Thereafter, titration was performed by adding 0.1 mol/L potassium hydroxide ethyl alcohol solution (produced by KISHIDA CHEMICAL Co., Ltd.) by 10 μL and reading the pH every time of addition. The 0.1 mol/L potassium hydroxide ethyl alcohol solution was added until the pH reached 10 or more and the pH was not changed by addition of 30 μL. A titration curve was obtained by plotting the amount of addition of 0.1 mol/L potassium hydroxide ethyl alcohol solution versus the pH on the basis of the obtained results. The point, at which the slope of change in pH was the largest, in the resulting titration curve was specified to be the neutralization point, and the acid value (mgKOH/g) was calculated from the amount of the added potassium hydroxide. The pKa is the same value as the pH at a half of the amount of 0.1 mol/L potassium hydroxide ethyl alcohol solution required for reaching the neutralization point and, therefore, the pH at a half amount was read from the titration curve.

Method for Determining Amount Required for Neutralization

The acid value of the resin having the ionic functional group is determined in the above-described item "Measurement of pKa of resin having ionic functional group". The amount of the neutralizer capable of entirely neutralizing this acid value of the resin was specified to be 100%.

For example, in the case of 100 g of resin having an acid value of 10 mgKOH/g, the amount of neutralizer required for neutralizing 100% of the resin is 17.8 mL as for 1.0 mol/L-KOH aqueous solution and the amount required for neutralizing 50% of the resin is 8.9 mL.

Measurement of NMR

The content of the monovalent group included in Polymer A and represented by Formula (1) described above was determined on the basis of nuclear magnetic resonance spectrometric analysis ($^1$H-NMR) [400 MHz, CDCl$_3$, room temperature (25° C.)].

Measurement apparatus: FTNMR spectrometer JNM-EX400 (JEOL LTD.)

Measurement frequency: 400 MHz

Pulse condition: 5.0 μs

Frequency range: 10,500 Hz

Number of acquisitions: 64 times

The molar ratio of each monomer component was determined from the integrated value of the resulting spectrum, and the content (percent by mole) of monovalent group contained in Polymer A and represented by Formula (1) described above was calculated on the basis of the molar ratio.

EXAMPLES

The present invention will be specifically described below with reference to the examples, although the present invention is not limited to these examples. In this regard, the term "part" refers to "part by mass".

Synthesis Example of Polymerizable Monomer M-1

Step 1

A dispersion was obtained by heat-mixing 100 g of 2,5-dihydroxybenzoic acid and 1,441 g of 80% sulfuric acid at 50° C. The resulting dispersion was mixed with 144 g of tert-butyl alcohol, and agitation was performed at 50° C. for 30 minutes. Thereafter, an operation of adding 144 g of tert-butyl alcohol to the resulting dispersion and performing agitation for 30 minutes was repeated three times, so that a reaction solution was obtained. The reaction solution was cooled to room temperature and was poured into 1 kg of iced water gradually, so that a precipitate was obtained. The precipitate was filtrated, was washed with water, and was washed with hexane. The precipitate was dissolved into 200 mL of methanol and was reprecipitated in 3.6 L of water. This was filtrated and, thereafter, the filtration residue was dried at 80° C., so that 74.9 g of salicylic acid intermediate represented by Formula (4) below was obtained.

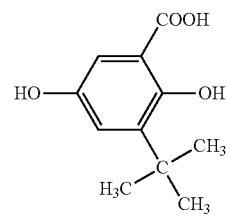

(4)

Step 2

A reaction solution was obtained by dissolving 25.0 g of salicylic acid intermediate obtained in Step 1 into 150 mL of methanol, adding 36.9 g of potassium carbonate, and performing heating to 65° C. A mixed solution of 18.7 g of 4-(chloromethyl)styrene and 100 mL of methanol was dropped into the resulting reaction solution, a reaction was allowed to proceed at 65° C. for 3 hours, so that a reaction solution was obtained. The reaction solution was cooled and filtrated and, thereafter, the filtrate was concentrated to obtain a crude product. The crude product was dispersed in 1.5 L of water having a pH of 2, and extraction was performed by adding ethyl acetate. Thereafter, an extract was washed with water and was dried by using magnesium sulfate. Ethyl acetate was removed by distillation under reduced pressure to obtain a precipitate. The precipitate was washed with hexane and was refined through recrystallization by using toluene and ethyl acetate, so that 20.1 g of Polymerizable monomer M-1 represented by Formula (5) below was obtained.

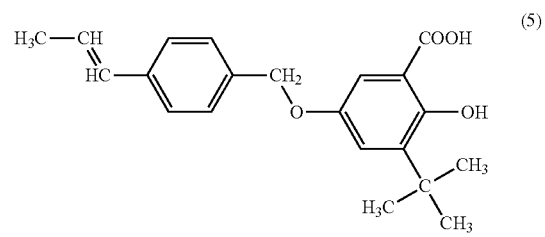 [SMILES: C/C=C/c1ccc(COc2cc(C(=O)O)c(O)c(C(C)(C)C)c2)cc1]

(5)

Synthesis Example of Polymerizable Monomer M-2

Polymerizable monomer M-2 represented by Formula (6) below was obtained in the same manner as the synthesis example of Polymerizable monomer M-1 except that the salicylic acid intermediate represented by Formula (4) above was changed to 18 g of 2,4-dihydroxybenzoic acid.

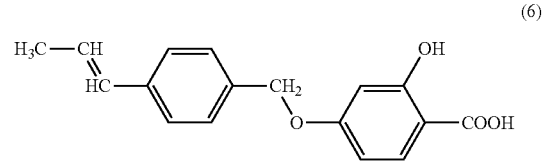 [SMILES: C/C=C/c1ccc(COc2ccc(C(=O)O)c(O)c2)cc1]

(6)

Synthesis Example of Polymerizable Monomer M-3

Polymerizable monomer M-3 represented by Formula (7) below was obtained in the same manner as the synthesis example of Polymerizable monomer M-1 except that the salicylic acid intermediate represented by Formula (4) above was changed to 18 g of 2,3-dihydroxybenzoic acid.

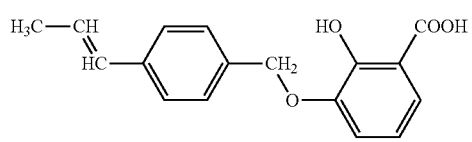

(7)

Synthesis Example of Polymerizable Monomer M-4

Polymerizable monomer M-4 represented by Formula (8) below was obtained in the same manner as the synthesis example of Polymerizable monomer M-1 except that the salicylic acid intermediate represented by Formula (4) above was changed to 18 g of 2,6-dihydroxybenzoic acid.

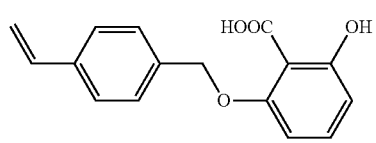

Formula (8)

Synthesis Example of Polymer 1

After 9.9 g of Polymerizable monomer M-1 represented by Formula (5) above and 60.1 g of styrene were dissolved into 42.0 mL of DMF and agitation was performed 1 hour while nitrogen bubbling was performed, heating to 110° C. was performed. A mixed solution of 4.62 g of tert-butyl peroxy isopropyl monocarbonate (trade name: PERBUTYL I, produced by NOF CORPORATION) and 42 mL of toluene serving as a polymerization initiator was dropped to the resulting reaction solution. In addition, a reaction was allowed to proceed at 110° C. for 4 hours. Subsequently, cooling was performed, and dropping to 1 L of methanol was performed, so that a precipitate was obtained. The resulting precipitate was dissolved into 120 mL of tetrahydrofuran. Thereafter, the resulting solution was dropped to 1.80 L of methanol to precipitate a white precipitate and filtration was performed. Drying was performed at 90° C. under reduced pressure, so that 57.6 g of Polymer 1 was obtained. NMR and the acid value of the resulting Polymer 1 were measured and, thereby, the content of the component derived from Polymerizable monomer M-1 was examined.

The pKa of Polymer 1 is shown in Table 1.

Synthesis Example of Polymer 2

A reaction container provided with an agitator, a condenser, a thermometer, and a nitrogen introduction tube was charged with 200 g of xylene, and refluxing was performed in a nitrogen stream.

Next, 9.0 g of 5-vinylsalicylic acid, 75.0 g of styrene, 16.0 g of 2-ethylhexyl acrylate, and 5.0 g of dimethyl-2,2'-azobis (2-methylpropionate) were mixed and dropped to the above-described reaction container while agitation was performed, and holding for 10 hours was performed. Thereafter, the solvent was removed by distillation, and drying was performed at 40° C. under reduced pressure, so that Polymer 2 was obtained.

The pKa of Polymer 2 is shown in Table 1.

Synthesis Examples of Polymers 3 to 5

Polymers 3 to 5 were obtained by performing synthesis in the same manner as Synthesis example of Polymer 2 except that the following changes were made.

Polymer 3:
9.0 g of 5-vinylsalicylic acid was changed to 5.3 g of phthalic acid-1-vinyl Polymer 4:
9.0 g of 5-vinylsalicylic acid was changed to 8.1 g of vinylbenzoic acid Polymer 5:
9.0 g of 5-vinylsalicylic acid was changed to 10.9 g of 1-vinylnaphthalene-2-carboxylic acid The pKa of each of Polymers 3 to 5 is shown in Table 1.

Synthesis Examples of Polymers 6 to 9

Polymers 6 to 9 were obtained in the same manner as Synthesis example of Polymer 1 except that the usage of the raw material was changed as shown in Table 2.

The pKa of each of Polymers 6 to 9 is shown in Table 1.

Synthesis Example of Polymer 10

A reaction container provided with an agitator, a condenser, a thermometer, and a nitrogen introduction tube was charged with 200 g of xylene, and refluxing was performed in a nitrogen stream.

Next, 6.0 g of 2-acrylamide-2-methylpropanesulfonic acid, 72.0 g of styrene, and 18.0 g of 2-ethylhexyl acrylate were mixed and dropped to the above-described reaction container while agitation was performed, and holding for 10 hours was performed. Thereafter, the solvent was removed by distillation, and drying was performed at 40° C. under reduced pressure, so that Polymer 10 was obtained.

The pKa of Polymer 10 is shown in Table 1.

Synthesis Example of Polymer 11

A reaction container provided with a nitrogen introduction tube, a dewatering tube, an agitator, and a thermocouple was charged with 500 g of bisphenol A-propylene oxide 2 mol adduct, 154 g of terephthalic acid, 45 g of fumaric acid, and 2 g of tin octylate, and a polycondensation reaction was allowed to proceed at 230° C. for 8 hours. Thereafter, the polycondensation reaction was continued at 8 kPa for further 1 hour. Subsequently, cooling to 160° C. was performed, so that a polyester was synthesized. Then, in the state of 160° C., 10 g of acrylic acid was put in, mixing and holding for 15 minutes were performed and, thereafter, a mixture of 142 g of styrene, 35 g of n-butyl acrylate, and 10 g of polymerization initiator (di-tert-butyl peroxide) was dropped with a dripping funnel over 1 hour. Subsequently, in the state in which 160° C. was maintained, an addition polymerization reaction was allowed to proceed for 1 hour. Then, the temperature was raised to 200° C. and was held at 10 kPa for 1 hour, so that Polymer 11 was obtained.

The pKa of Polymer 11 is shown in Table 1.

TABLE 1

| | pKa |
|---|---|
| Polymer 1 | 7.2 |
| Polymer 2 | 6.6 |
| Polymer 3 | 8.1 |
| Polymer 4 | 8.5 |
| Polymer 5 | 8.8 |
| Polymer 6 | 7.3 |
| Polymer 7 | 7.7 |
| Polymer 8 | 7.8 |
| Polymer 9 | 7.3 |
| Polymer 10 | −0.5 |
| Polymer 11 | 5.5 |

TABLE 2

| | Polymerizable monomer having monovalent group represented by Formula (1) | | Styrene | n-Butyl acrylate | Polymerization initiator | Content of monovalent group represented by Formula (1) |
|---|---|---|---|---|---|---|
| | Type | Usage (g) | Usage (g) | Usage (g) | Usage (g) | (mol %) |
| Polymer 1 | M-1 | 9.9 | 60.1 | 0 | 4.62 | 5.0 |
| Polymer 6 | M-2 | 8.4 | 61.6 | 0 | 4.62 | 5.5 |
| Polymer 7 | M-3 | 8.4 | 61.6 | 0 | 4.62 | 5.0 |
| Polymer 8 | M-4 | 8.4 | 61.6 | 0 | 4.62 | 5.3 |
| Polymer 9 | M-2 | 8.2 | 50.3 | 11.6 | 4.62 | 5.4 |

Example 1

Production Example of Resin Particle 1

A reaction container provided with an agitator, a condenser, a thermometer, and a nitrogen introduction tube was charged with 200.0 parts of methyl ethyl ketone (MEK) (solubility parameter: 9.3), and 100.0 parts of Polymer 1 was added and dissolved (step to obtain a resin-containing solution).

Subsequently, 30.9 parts of 1.0 mol/L potassium hydroxide aqueous solution (70% neutralization) serving as a neutralizer was added (neutralizer mixing step). After agitation was performed for 10 minutes, 500.0 parts of ion-exchanged water was dropped gradually to cause emulsification (granulation step).

The resulting emulsion was subjected to distillation under reduced pressure to remove the solvent, and ion-exchanged water was added in such a way that the resin concentration was adjusted to 20%, so that water dispersed Resin particle 1 was obtained.

Examples 2 to 18 and Comparative Examples 1 to 8

Production Examples of Resin Particles 2 to 18 and Resin Particles 20 to 27

The polymer and the type and amount of the neutralizer were changed as shown in Table 3.

As for Resin particle 15, methyl ethyl ketone was changed to tetrahydrofuran (THF) (solubility parameter: 9.1).

Water-dispersed Resin particles 2 to 18 and Resin particles 20 to 27 were obtained in the same manner as production example of Resin particle 1 except that described above.

Example 19

Production Example of Resin Particle 19

A reaction container provided with an agitator, a condenser, a thermometer, and a nitrogen introduction tube was charged with 200.0 parts of methyl ethyl ketone and 100.0 parts of Polymer 1 was added and dissolved.

Subsequently, 30.9 parts of 1.0 mol/L potassium hydroxide aqueous solution (70% neutralization) serving as a neutralizer was added and agitation was performed for 10 minutes, so that Solution 1 was formed.

Solution 1 was added to 500.0 parts of ion-exchanged water, so that the state of being separated into two phases was brought about.

Thereafter, agitation was performed for 10 minutes with a high-speed agitator (trade name: Cleamix) produced by M Technique Co., Ltd., at the number of revolutions adjusted to 8,000 rpm.

The resulting emulsion was subjected to distillation under reduced pressure to remove the solvent, and ion-exchanged water was added in such a way that the resin concentration was adjusted to 20%, so that water dispersed Resin particle 19 was obtained.

The properties of the resulting water-dispersed Resin particle 1 to Resin particle 27 are shown in Table 3.

TABLE 3

| | | | Neutralizer | | | | Median diameter | |
|---|---|---|---|---|---|---|---|---|
| | Resin particle | Polymer | Organic solvent | Type | [part] | Ratio of neutralizable ionic functional group [mol %] | Degree of neutralization [mol %] | Dv50 [nm] | Dv50/Dn50 |
| Example 1 | 1 | 1 | MEK | 1.0 mol/L KOH aqueous solution | 30.9 | 70 | 70 | 66 | 1.3 |
| Example 2 | 2 | 1 | MEK | 1.0 mol/L KOH aqueous solution | 44.1 | 70 | 70 | 64 | 1.4 |
| | | | | 1.0 mol/L HCl aqueous solution | 13.2 | | | | |
| Example 3 | 3 | 1 | MEK | 1.0 mol/L KOH aqueous solution | 15.5 | 70 | 70 | 62 | 1.3 |
| | | | | 1.0 mol/L NaOH aqueous solution | 15.4 | | | | |
| Example 4 | 4 | 1 | MEK | 1.0 mol/L NaOH aqueous solution | 30.9 | 70 | 70 | 63 | 1.5 |
| Example 5 | 5 | 1 | MEK | 1.0 mol/L LiOH aqueous solution | 30.9 | 70 | 70 | 60 | 1.4 |

TABLE 3-continued

| | Resin particle | Polymer | Organic solvent | Neutralizer Type | [part] | Ratio of neutralizable ionic functional group [mol %] | Degree of neutralization [mol %] | Median diameter Dv50 [nm] | Dv50/Dn50 |
|---|---|---|---|---|---|---|---|---|---|
| Example 6 | 6 | 1 | MEK | 1.0 mol/L KOH aqueous solution | 22.1 | 50 | 50 | 154 | 2.2 |
| Example 7 | 7 | 1 | MEK | 1.0 mol/L KOH aqueous solution | 26.5 | 60 | 60 | 96 | 1.5 |
| Example 8 | 8 | 1 | MEK | 1.0 mol/L KOH aqueous solution | 35.4 | 80 | 80 | 38 | 1.6 |
| Example 9 | 9 | 1 | MEK | 1.0 mol/L KOH aqueous solution | 39.8 | 90 | 90 | 34 | 2.1 |
| Example 10 | 10 | 1 | MEK | 0.5 mol/L Ca(OH)$_2$ aqueous solution | 30.9 | 70 | 70 | 94 | 2.4 |
| Example 11 | 11 | 2 | MEK | 1.0 mol/L KOH aqueous solution | 43.7 | 70 | 70 | 93 | 1.8 |
| Example 12 | 12 | 3 | MEK | 1.0 mol/L KOH aqueous solution | 43.7 | 70 | 70 | 84 | 1.8 |
| Example 13 | 13 | 4 | MEK | 1.0 mol/L KOH aqueous solution | 43.7 | 70 | 70 | 88 | 1.6 |
| Example 14 | 14 | 5 | MEK | 1.0 mol/L KOH aqueous solution | 43.7 | 70 | 70 | 78 | 1.5 |
| Example 15 | 15 | 6 | THF | 1.0 mol/L KOH aqueous solution | 32.2 | 70 | 70 | 72 | 1.5 |
| Example 16 | 16 | 7 | MEK | 1.0 mol/L KOH aqueous solution | 29.5 | 70 | 70 | 96 | 1.7 |
| Example 17 | 17 | 8 | MEK | 1.0 mol/L KOH aqueous solution | 31.2 | 70 | 70 | 58 | 1.5 |
| Example 18 | 18 | 9 | MEK | 1.0 mol/L KOH aqueous solution | 34.0 | 70 | 70 | 52 | 1.7 |
| Example 19 | 19 | 1 | MEK | 1.0 mol/L KOH aqueous solution | 30.9 | 70 | 70 | 84 | 2.5 |
| Comparative example 1 | 20 | 1 | MEK | 1.0 mol/L KOH aqueous solution | 13.2 | 30 | 30 | 642 | 3.6 |
| Comparative example 2 | 21 | 1 | MEK | 1.0 mol/L KOH aqueous solution | 44.1 | 100 | 100 | 324 | 2.8 |
| Comparative example 3 | 22 | 1 | MEK | 1.0 mol/L KOH aqueous solution | 66.2 | 150 | 150 | 284 | 2.6 |
| Comparative example 4 | 23 | 1 | MEK | dimethylamino-ethanol | 3.8 | 70 | 70 | 120 | 2.9 |
| Comparative example 5 | 24 | 2 | MEK | dimethylamino-ethanol | 2.5 | 47 | 47 | 164 | 2.9 |
| Comparative example 6 | 25 | 2 | MEK | dimethylamino-ethanol | 3.8 | 71 | 71 | 78 | 2.8 |
| Comparative example 7 | 26 | 10 | MEK | 1.0 mol/L KOH aqueous solution | 42.9 | 70 | 70 | 120 | 1.4 |
| Comparative example 8 | 27 | 11 | MEK | 1.0 mol/L KOH aqueous solution | 28.6 | 70 | 70 | 56 | 1.6 |

Toner Production Example 1

Production of Toner Base Particles

A container provided with a high-speed agitator (trade name: Cleamix) produced by M Technique Co., Ltd., was charged with 850.0 parts of 0.1 mol/L Na PO$_4$ aqueous solution, the number of revolutions was adjusted to 15,000 rpm, and the temperature was raised to 60° C. An aqueous medium containing Ca$_3$(PO$_4$)$_2$, which was fine, poorly water-soluble dispersing agent, was prepared by adding 68.0 parts of 1.0 mol/L CaCl$_2$ aqueous solution thereto.

Meanwhile, a solution was prepared by agitating the following materials with a propeller agitator under the condition that the number of revolutions was 100 rpm.

| | |
|---|---|
| Styrene | 70.0 parts |
| n-Butyl acrylate | 30.0 parts |
| Saturated polyester (terephthalic acid-propylene oxide-modified bisphenol A copolymer, acid value: 13 mgKOH/g, weight average molecular weight (Mw): 14,500) | 3.0 parts |

Next, a mixed solution was prepared by adding the following materials to the above-described solution.

| | |
|---|---|
| C.I. Pigment Blue 15:3 | 6.5 parts |
| Ester wax (primary component: $C_{21}H_{43}COOC_{22}H_{45}$, melting point: 72.5° C.) | 12.0 parts |

Thereafter, the temperature of the mixed solution was raised to 60° C., agitation was performed with a TK homomixer produced by Tokushu Kika Kogyo Co., Ltd., under the condition that the number of revolutions was 9,000 rpm, so that the above-described materials were dissolved and dispersed.

A polymerizable monomer composition was prepared by dissolving 10.0 parts of 2,2'-azobis(2,4-dimethylvaleronitrile) into that.

The above-described polymerizable monomer composition was put into the above-described aqueous medium, and particles of the above-described polymerizable monomer composition were formed (granulated) while the high-speed agitator (trade name: Cleamix) produced by M Technique Co., Ltd., was operated for 15 minutes at 60° C. and the number of revolutions of 15,000 rpm.

Subsequently, the contents were transferred to a container of a propeller agitator, and a polymerization reaction was allowed to proceed at 70° C. for 5 hours while agitation was performed under the condition that the number of revolutions was 100 rpm. Thereafter, the temperature was raised to 80° C. and the polymerization reaction was allowed to proceed for further 5 hours.

Next, 200.0 parts of ion-exchanged water was added, a reflux tube was detached, and a distillation apparatus was attached. Distillation was performed for 5 hours under the condition in which the temperature in the container of the above-described agitator was specified to be 100° C. The distillate was 700.0 parts. A polymer slurry was obtained by cooling to 30° C. A dispersion of toner base particles was obtained by adding ion-exchanged water in such a way that the concentration of polymer particles in the dispersion was adjusted to 20%.

A small amount of the resulting dispersion of toner base particles was taken, the pH was adjusted to 1.5 by adding 10% hydrochloric acid, and agitation was performed for 2 hours. Thereafter, washing with ion-exchanged water was performed sufficiently, filtration and drying were performed, and the glass transition temperature (Tg) of the toner base particles was measured. The glass transition temperature (Tg) was 50.3° C.

Adhesion of Resin Particles

A reaction container provided with a reflux cooling tube, an agitator, and a thermometer was charged with 500.0 parts (solid content 100.0 parts) of the above-described dispersion of toner base particles, and the pH was adjusted to 8.5 by adding a potassium hydroxide aqueous solution while agitation was performed (pH adjustment). After 5.0 parts (solid content 1.0 parts) of water-dispersed Resin particle 1 was gradually added thereto at 22° C. (addition temperature), agitation was performed for 15 minutes under the condition that the number of revolutions was 200 rpm.

Next, the temperature of the dispersion of the toner base particles with resin particles adhering thereto was held at 80° C. (heating temperature) by using an oil bath for heating, and agitation was continued for 1 hour. Thereafter, the dispersion was cooled to 20° C., 10% hydrochloric acid was added until the pH reached 1.5, and agitation was performed for 2 hours. In addition, after washing with ion-exchanged water was performed sufficiently, filtration, drying, and classification were performed, so that Toner particle 1 was obtained. The weight average particle diameter of the resulting Toner particle 1 was 6.1 μm.

Toner 1 was obtained by mixing 100.0 parts of Toner particle 1 described above and 1.0 parts of silica fine particles, which served as a fluidity improving agent and which had been subjected to a hydrophobic treatment, for 15 minutes with a Henschel mixer produced by Mitsui Miike under the condition that the number of revolutions was 3,000 rpm (external addition). In this regard, the above-described silica fine particles were used after being treated with dimethylsilicone oil (20 percent by mass), the number average particle diameter of primary particles thereof was 10 nm, and the BET specific surface area was 170 m$^2$/g.

Toner Production Examples 2 to 27

Toners 2 to 27 were obtained in the same manner as Toner production example 1 except that the water-dispersed Resin particle 1 to be used was changed to water-dispersed Resin particles 2 to 27.

Examples 20 to 38 and Comparative Examples 9 to 16

The performance evaluation of Toners 1 to 27 was performed on the basis of the methods described below. The results are shown in Table 4.

A modified machine of a color laser beam printer (trade name: LBP7600C) produced by CANON KABUSHIKI KAISHA was used as an evaluation machine. The modification point was that the circumferential speed of a photosensitive drum was specified to be 250 mm/second. LBP7600C (trade name) was a color laser beam printer (imaging apparatus (electrophotographic apparatus)) by using a one-component development system.

As for paper (recording medium), laser beam printer paper (trade name: CS-680, 68 g/m$^2$) produced by CANON KABUSHIKI KAISHA was used. Then, the product toner was taken off a cyan cartridge for the above-described color laser printer, the inside was cleaned by air blow and, thereafter, 150 g of Toner 1 was filled. Meanwhile, the product toners were taken off the magenta, yellow, and black cartridges, remaining toner amount detection mechanisms were deactivated, and the resulting magenta, yellow, and black cartridges were inserted into magenta, yellow, and black stations, respectively.

Evaluation of Environmental Stability

A solid image was output in such a way that the adhesion amount of toner was specified to be 0.5 mg/cm$^2$ in an environment of 23° C./50% RH (N/N environment).

The density of the image of a solid portion was measured with Mcbeth reflection densitometer (trade name: RD918) produced by Mcbeth.

Next, the same evaluation as that in the above-described N/N environment was performed in an environment of 30° C./80% RH (H/H environment), and a difference in image density between the N/N environment and the H/H environment was calculated. The evaluation results were ranked into A to D on the basis of the following criteria. It was considered that the effects of the present invention were obtained in the ranks A to C.

A: 0.00 or more and less than 0.05
B: 0.05 or more and less than 0.10
C: 0.10 or more and less than 0.20
D: 0.20 or more Evaluation of Durability A solid image was output in such a way that the adhesion amount of toner was specified to be 0.5 mg/cm$^2$ in the N/N environment. After 10,000 sheets of images with a printed area (toner adhesion area) of 10% were output, a solid image was output.

The densities of the initial image and the image after 10,000 sheets of images was output were measured, a difference between the density of the initial image and the density of the image after 10,000 sheets of images were output was calculated, and the results were ranked into A to D on the basis of the following criteria.

A: 0.00 or more and less than 0.05
B: 0.05 or more and less than 0.10
C: 0.10 or more and less than 0.20
D: 0.20 or more

TABLE 4

| | Toner | Resin particle | Environmental stability Evaluation | Density difference | Durability Evaluation | Density difference |
|---|---|---|---|---|---|---|
| Example 20 | 1 | 1 | A | 0.02 | A | 0.03 |
| Example 21 | 2 | 2 | A | 0.03 | A | 0.02 |
| Example 22 | 3 | 3 | A | 0.02 | A | 0.03 |
| Example 23 | 4 | 4 | A | 0.03 | A | 0.03 |
| Example 24 | 5 | 5 | A | 0.02 | A | 0.02 |
| Example 25 | 6 | 6 | A | 0.03 | B | 0.07 |
| Example 26 | 7 | 7 | A | 0.02 | A | 0.04 |
| Example 27 | 8 | 8 | A | 0.03 | A | 0.03 |
| Example 28 | 9 | 9 | A | 0.03 | B | 0.06 |
| Example 29 | 10 | 10 | A | 0.03 | C | 0.25 |

TABLE 4-continued

| | Toner | Resin particle | Environmental stability | | Durability | |
|---|---|---|---|---|---|---|
| | | | Evaluation | Density difference | Evaluation | Density difference |
| Example 30 | 11 | 11 | B | 0.06 | A | 0.04 |
| Example 31 | 12 | 12 | A | 0.03 | A | 0.04 |
| Example 32 | 13 | 13 | A | 0.04 | A | 0.02 |
| Example 33 | 14 | 14 | B | 0.07 | A | 0.03 |
| Example 34 | 15 | 15 | A | 0.03 | A | 0.03 |
| Example 35 | 16 | 16 | A | 0.02 | A | 0.04 |
| Example 36 | 17 | 17 | A | 0.03 | A | 0.03 |
| Example 37 | 18 | 18 | A | 0.03 | A | 0.04 |
| Example 38 | 19 | 19 | A | 0.03 | C | 0.16 |
| Comparative example 9 | 20 | 20 | A | 0.03 | D | 0.34 |
| Comparative example 10 | 21 | 21 | A | 0.02 | D | 0.26 |
| Comparative example 11 | 22 | 22 | A | 0.03 | D | 0.23 |
| Comparative example 12 | 23 | 23 | A | 0.03 | D | 0.25 |
| Comparative example 13 | 24 | 24 | B | 0.07 | D | 0.24 |
| Comparative example 14 | 25 | 25 | B | 0.06 | D | 0.23 |
| Comparative example 15 | 26 | 26 | D | 0.34 | A | 0.04 |
| Comparative example 16 | 27 | 27 | D | 0.25 | A | 0.04 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A method for manufacturing resin particles, each of which contains a resin having an ionic functional group and pKa of 6.0 or more and 9.0 or less, the method comprising the step of:
producing the resin particles by using a liquid which is prepared with the resin, an organic solvent, which can dissolve the resin and which has a solubility parameter of 12.0 or less, water, and a neutralizer in an amount necessary for neutralizing 50 percent by mole or more and 90 percent by mole or less of the ionic functional group,
wherein the neutralizer contains at least one type selected from the group consisting of an acid having a pKa of 3.0 or less and a base having a pKb of 3.0 or less.

2. The method for manufacturing resin particles according to claim 1, wherein the neutralizer contains the base having a pKb of 3.0 or less.

3. The method for manufacturing resin particles, according to claim 2, wherein the base having a pKb of 3.0 or less includes at least one type selected from the group consisting of bases containing Li, bases containing Na, and bases containing K.

4. The method for manufacturing resin particles, according to claim 3, wherein the base having a pKb of 3.0 or less includes at least one type selected from the group consisting of LiOH, NaOH, and KOH.

5. The method for manufacturing resin particles, according to claim 1, wherein the pKa of the resin is 7.0 or more and 8.5 or less.

6. The method for manufacturing resin particles, according to claim 1, wherein the ionic functional group is a carboxy group bonding to an aromatic ring.

7. The method for manufacturing resin particles, according to claim 1, wherein the resin is a vinyl polymer.

8. A method for manufacturing toner particles, comprising the steps of:
producing toner base particles including a colorant, a binder resin, and wax;
producing resin particles by using the manufacturing method according to claim 1; and
obtaining toner particles by allowing the resin particles to adhere to the toner base particles.

9. The method for manufacturing toner particles, according to claim 8, wherein the median diameter (Dv50) on a volume basis of the resin particles is 5 nm or more and 200 nm or less.

10. The method for manufacturing toner particles, according to claim 8, wherein Dv50/Dn50 representing the ratio of the median diameter (Dv50) on a volume basis to the median diameter (Dn50) on a number basis of the resin particles is 2.5 or less.

11. A method for manufacturing resin particles, comprising:
a step of obtaining a resin-containing solution, in which a resin is dissolved in an organic solvent, by mixing the resin having an ionic functional group and a pKa of 6.0 or more and 9.0 or less and the organic solvent, which can dissolve the resin and which has a solubility parameter of 12.0 or less;
a neutralizer mixing step of obtaining a mixed solution, in which 50 percent by mole or more and 90 percent by mole or less of the ionic functional group included in the resin is neutralized with a neutralizer, by mixing the resin-containing solution and the neutralizer;
a granulation step of obtaining a dispersion, in which particles of mixed solution are dispersed in water; and
a step of removing the organic solvent from the dispersion,
wherein the neutralizer contains at least one type selected from the group consisting of an acid having a pKa of 3.0 or less and a base having a pKb of 3.0 or less.

12. The method for manufacturing resin particles, according to claim 11, wherein the granulation step is a step to granulate through phase inversion emulsification or agitation.

* * * * *